(12) United States Patent
Chen

(10) Patent No.: US 7,198,240 B2
(45) Date of Patent: Apr. 3, 2007

(54) STRUCTURE FOR AN ADJUSTABLE SUPPORT OF MONITOR (75) Inventor: Tonny Chen, Chang-Hua (TW)

(73) Assignee: E-Lead Electronic Co., Ltd., Chang-Hua (TW)

( * ) Notice: Subject to any disclaimer, the term of this patent is extended or adjusted under 35 U.S.C. 154(b) by 0 days.

(21) Appl. No.: 10/640,010

(22) Filed: Aug. 14, 2003

(65) Prior Publication Data
US 2005/0035252 A1 Feb. 17, 2005

(51) Int. Cl.
E04G 3/00 (2006.01)

(52) U.S. Cl. .................. 248/284.1; 248/918; 248/919; 361/683; 361/682; 403/327

(58) Field of Classification Search ............ 248/284.1, 248/917, 918, 919, 920, 295.11, 124.1, 125.1, 248/125.2, 122.1, 161, 157, 404; 403/327, 403/328, 325; 361/683, 682
See application file for complete search history.

(56) References Cited

U.S. PATENT DOCUMENTS 5,697,595 A * 12/1997 Sperber ...................... 248/452
6,189,849 B1 * 2/2001 Sweere et al. ........... 248/286.1
6,381,125 B1 * 4/2002 Mizoguchi et al. ......... 361/682
6,381,128 B1 * 4/2002 Kramer ...................... 361/683
6,708,940 B2 * 3/2004 Ligertwood ................. 248/324
6,712,321 B1 * 3/2004 Su et al. ................. 248/123.11
6,918,564 B2 * 7/2005 Yen et al. ................... 248/404
6,921,057 B2 * 7/2005 Chen et al. ............. 248/349.1
2004/0011932 A1 * 1/2004 Duff .......................... 248/157

* cited by examiner

Primary Examiner—Kimberly Wood
(74) Attorney, Agent, or Firm—Troxell Law Office, PLLC (57) ABSTRACT A structure for an adjustable support of monitor including a main body connected to a monitor at a front and a positioning apparatus on an inside for controlling up and down movements of the monitor; and a connecting device pivotally connected with the main body on a front and coupled at a rear to a fastening device connected to a car. The positioning device includes a positioning member for positioning the monitor; and a stop member for releasing the positioning member to make the positioning member to move.

11 Claims, 7 Drawing Sheets

STRUCTURE FOR AN ADJUSTABLE SUPPORT OF MONITOR

BACKGROUND OF THE INVENTION

1. Field of the Invention

The present invention relates to a monitor support, more particularly, and to an adjustable support of monitor discloses the monitor which could adjust up and down or sight angle and dismantle or assemble to adjust the place in the car.

2. Description of the Related Art

Presently, people does not only consider the speed and comfort of the car, but also notice the multimedia in the car such as CD, VCD, DVD, MP3, NAVI, etc. Therefore, the multimedia equipments are necessary machine on the car, but the space of car is limited. The monitor of the multimedia equipments set in the car is difficult, so the manufacturer resigns the space of the car to embed the multimedia equipments. Taiwan Pat. Application No. 90,201,673 discloses a structure for putting the monitor into a box or the multimedia equipment. The disadvantage of the prior art is that people could not adjust the position of the monitor according the slight angle, so the car has the multimedia equipment but it is inconvenient to watch.

SUMMARY OF THE INVENTION

It is an object of the present invention to provide a structure for an adjustable support of monitor which could adjust the monitor down or up and the slight angle in accordance with the version of people, and further could dismantle or assemble any position of car.

To achieve the above mention of advantages, the present invention discloses a structure for an adjustable support of monitor comprising a monitor deposited at the front of a main body which includes a positioning apparatus to move the monitor down or up, at the front of a connecting means pivoting with the main body and at the back of it connecting to an assembly means for fastening the adjustable support of the present invention on the car. Therefore, the monitor could move down or up or slight angle of people by the above mention structure, further more the present invention could easily dismantle or assemble in any position of car.

It is to be understood that both the foregoing general description and the following detailed description are exemplary, and are intended to provide further explanation of the invention as claimed.

BRIEF DESCRIPTION OF THE DRAWINGS

The accompanying drawing is included to provide a further understanding of the invention, and is incorporated in and constitutes a part of this specification. The drawing illustrates an embodiment of the invention and, together with the description, serves to explain the principles of the invention. In the drawing.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers are used in the drawings and the description to refer to the same or like parts.

Refer to FIGS. 1 to 5, a structure for an adjustable support of monitor of the present invention comprises a main body 1 which includes a positioning apparatus 2 to control the main body 1 down or up, a connecting means 3, wherein at the front of the main body 1 deposits a monitor and at front of the connecting means 3 pivots with the main body 1 and the back of the connecting means 3 couples to an assembly means 4.

Figure 1:
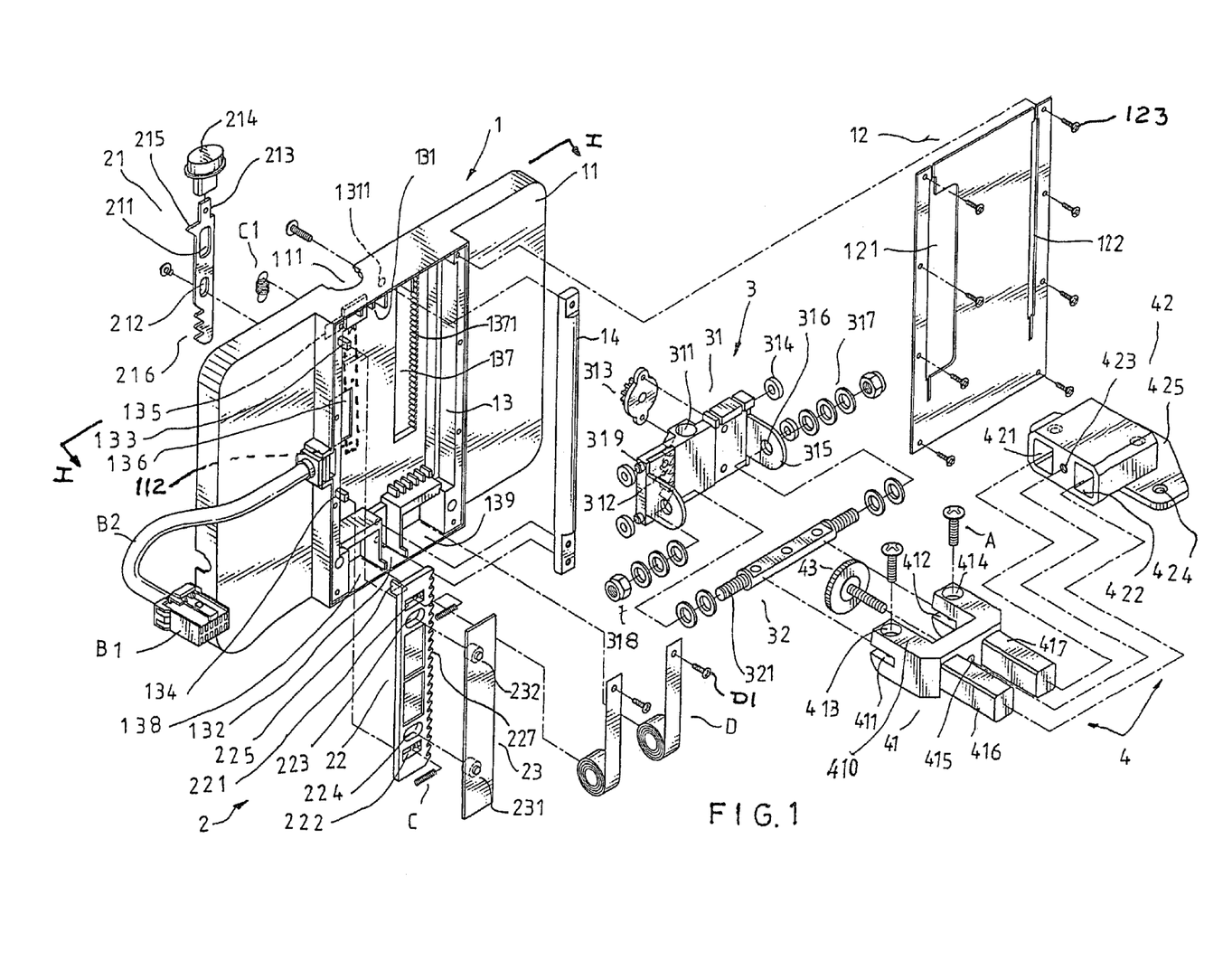
FIG. 1 is an explosive view showing the structure for an adjustable support of the present invention.

The main body 1 has a plate 11 for placing the monitor 10, and at the back of the plate 11 has an alcove 13 being covered by a cover 12 and connected by screws 123. And, the both side of the cover 12 has a left strip hole 121 and a right strip hole 122. Further, the main body 1 connects to a wire B2 with a plug B1 for electrically connecting to a machine 5 which provides a signal. The alcove 13 comprises an upper room 131 and a lower room 132 at the bottom, and the upper and lower rooms 131,132 has a hole 1311 to fasten with a rod 14 by a screw bolt A. The side of alcove 13 has a first bar 133 at the upper and a second bar 134 at the bottom which is opposed to each other deposited, and the alcove 13 has a cavity 135 neighbor up the first bar 133, and opening 136 at the middle, a strip slot 137 opposed to the opening 136 which has a strip gear train 1371, and two spring rooms 138,139 at the bottom. The top of the plate 11 has a concavity 111 extending a place 112 which has two pins 113.

The positioning apparatus comprises a positioning member 22, a stop member 21, and a limited cover 23.

The stop member 21 places in the place 112 of the main body 1 and has two limited holes 211, 212 opposed to the pin 113 deposited and a beetle sheet 213 at the top for placing a button 214, and the side of the stop member 21 has a bevel beetle sheet 215 at the top and a third gear train 216 at the bottom. Further, the side of the stop member 21 has a hooked pin 217 for providing a spring C1 to fasten with the hooked pin 217 and the pin 113 of the main body Each up and lower side of the positioning member 22 comprises first rooms 221, 222 for placing the springs C and the first and second bars 133, 134 of the main body and second rooms 223, 224. The side of the positioning member 22 has a block 225 opposed to the bevel beetle sheet 315 of the stop member 21 deposited, and includes a first gear train 226 located on a back (shown in FIG. 5) and inserted through a cavity 136 of the main body 1, and a second gear train 227 is deposited on the other side an edge of the positioning member 22.

The limited cover 23 is for covering the positioning member 22 and comprises two pins 231, 232 opposed to the second rooms 223, 224.

The connecting means 3 comprises a base 31 and a pivot 32. The base 31 has a hole 311 at the upper for fastening the rod 14, and a positioning gear train 312 deposits the side of the hole 311, and a damper 313 deposits the other side of the hole 311 for matching a gear train 1371 of the strip slot 137 of the alcove 13 of the main body 1, and the both side of the base 31 has a plurality of gears 319 to connect to rollers 314 which deposits upper and the bottom of each side for making the main body 1 to easily moving down or up, and further the both side of the base 31 extends back two fastening ears 315 which have holes 316. The base 31 is placed in the alcove 13 of the main body 1, and two fastening ears 315 of the base 31 pass through the left, right strip hole 121,122 of the cover 12. The holes at the bottom of the base 31 fasten with a spring band D with screws D1, and the side of the spring band D places in the two spring rooms 138,139. Both side of the pivot 32 comprises a screw thread 321, and the pivot 32 deposits to the hole 316 of the fastening ear 315 of the base 31 and is fastened by at least one pad 317 placed both side of the fastening ear 315 and a nut 318.

The assembly means 4 comprises a fastening member 41, and a fastening slot 42.

The fastening member 41 is like "H" shape comprising a n-shape 410 at the front, and the both side of the n-shape 410 place two slots 411, 412 for fastening the pivot 32. The vertical side of the slots 411, 412 has two fastening holes 413, 414 for being fastened the pivot 32 by the screw bolt A. The fastening member 41 has a hole 415 at the middle for a screw bolt 43 passed. Further, the rear of the fastening member 41 has two inserting members 416, 417.

The fastening slot 42 comprises two rooms 421, 422 opposed to the two inserting members 416, 417 placed, and between the two rooms 421, 422 has a hole 423 opposed to the hole 415 of the fastening member 41. And, the flange of the fastening slot 42 has a hole 424 containing an outshot 425.

Figure 2:
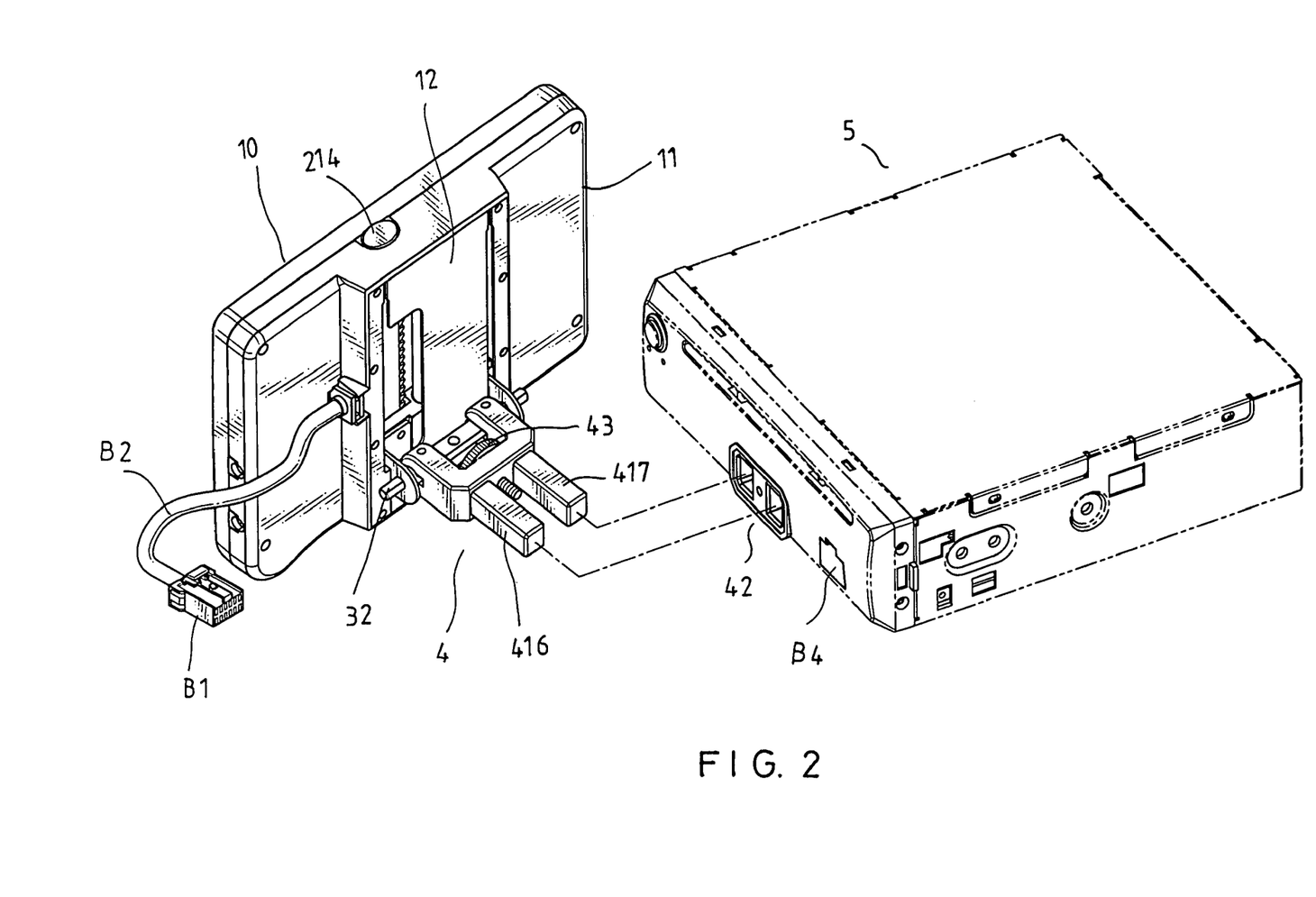
FIG. 2 is a schematic view showing the structure for an adjustable support of the present invention.
Figure 3:
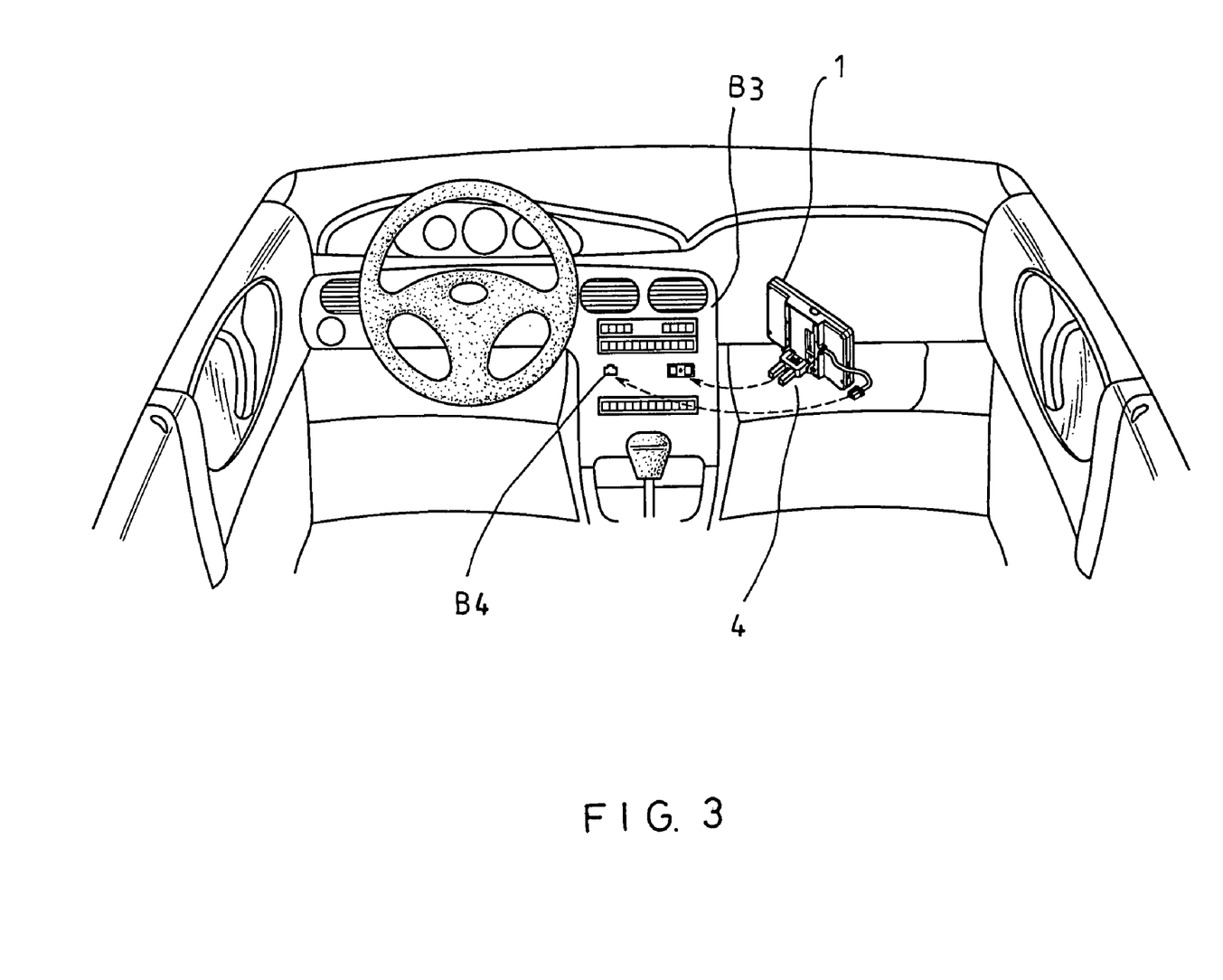
FIG. 3 is a schematic view showing the structure for and adjustable support
Figure 4:
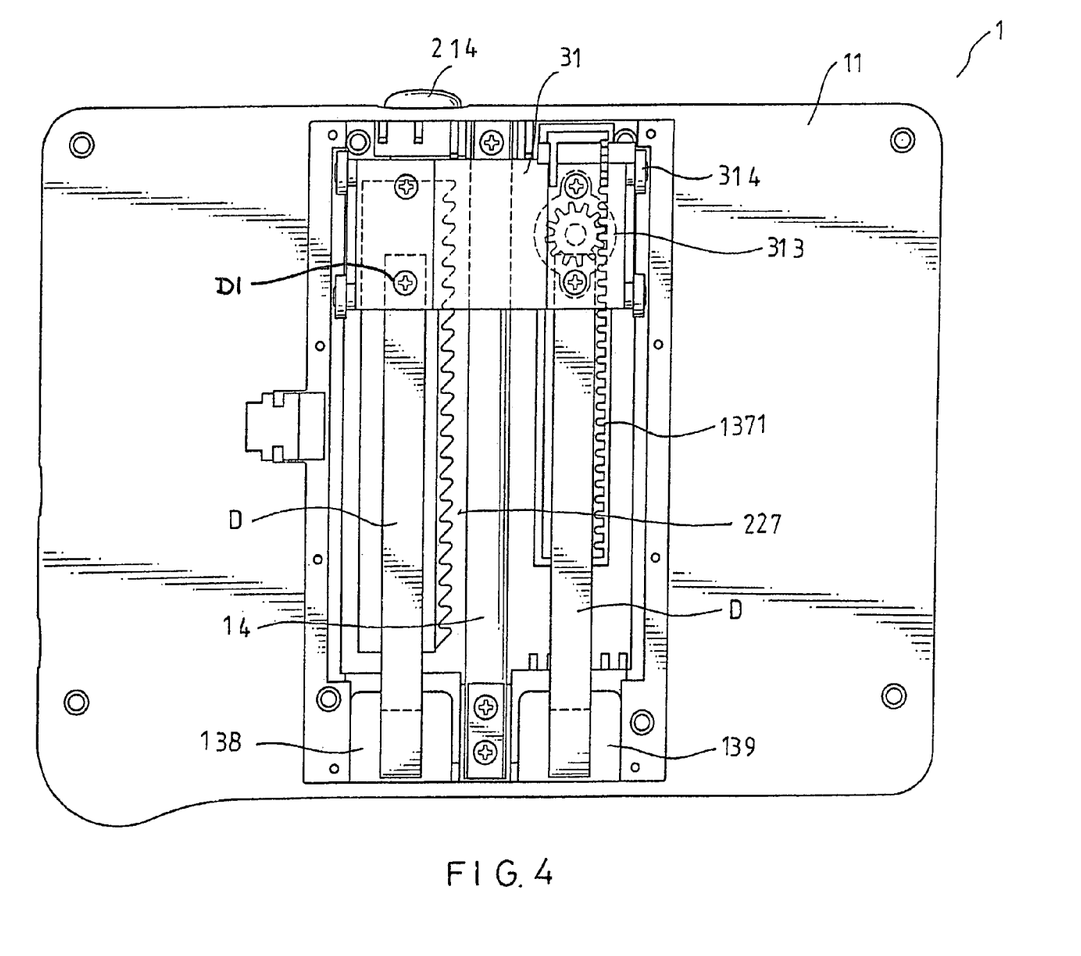
FIG. 4 is a back view of FIG. 1 showing the main body of the present invention.
Figure 5:
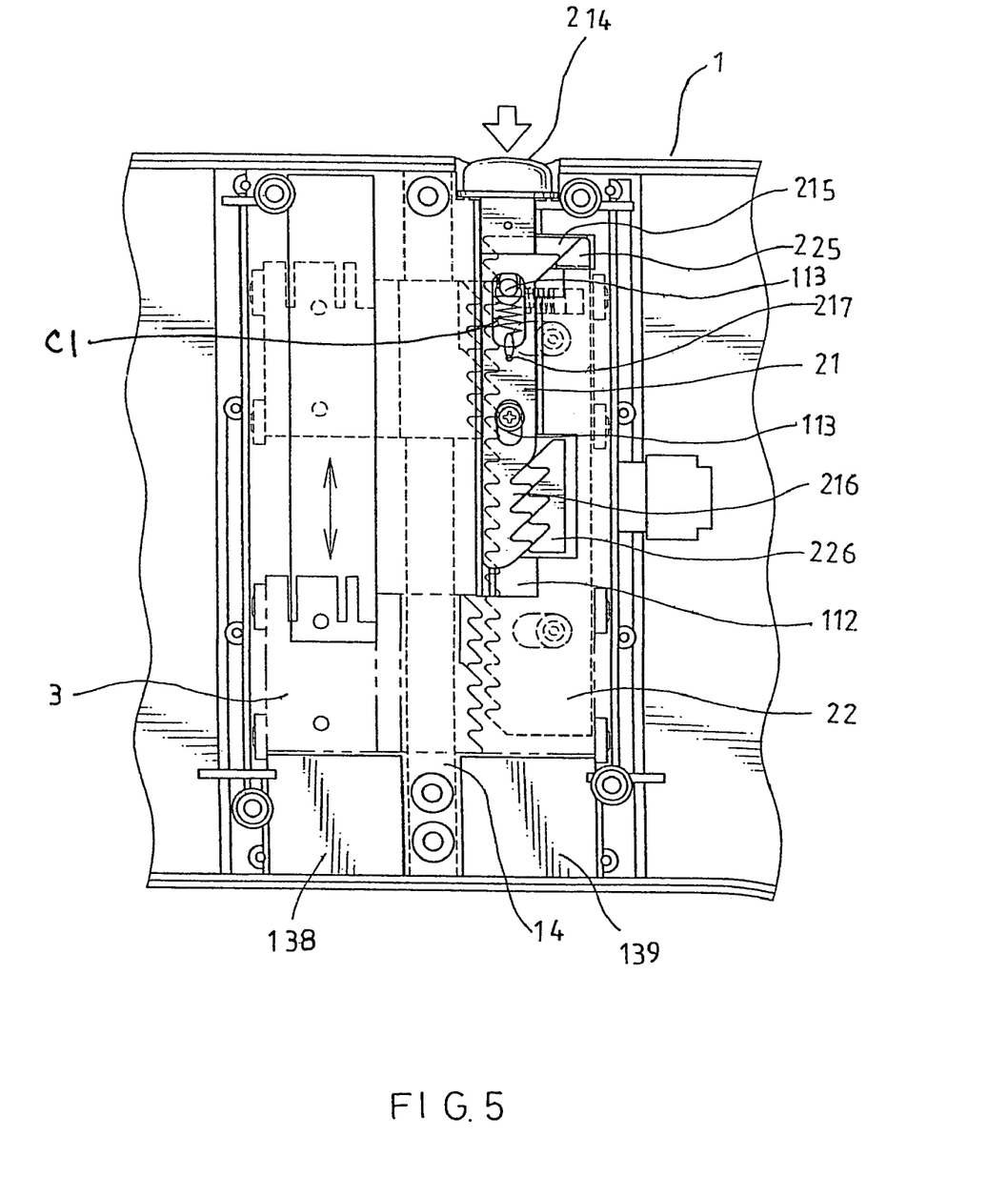
FIG. 5 is a sectional view of FIG. 1 showing the main body of the present invention.
Figure 6:
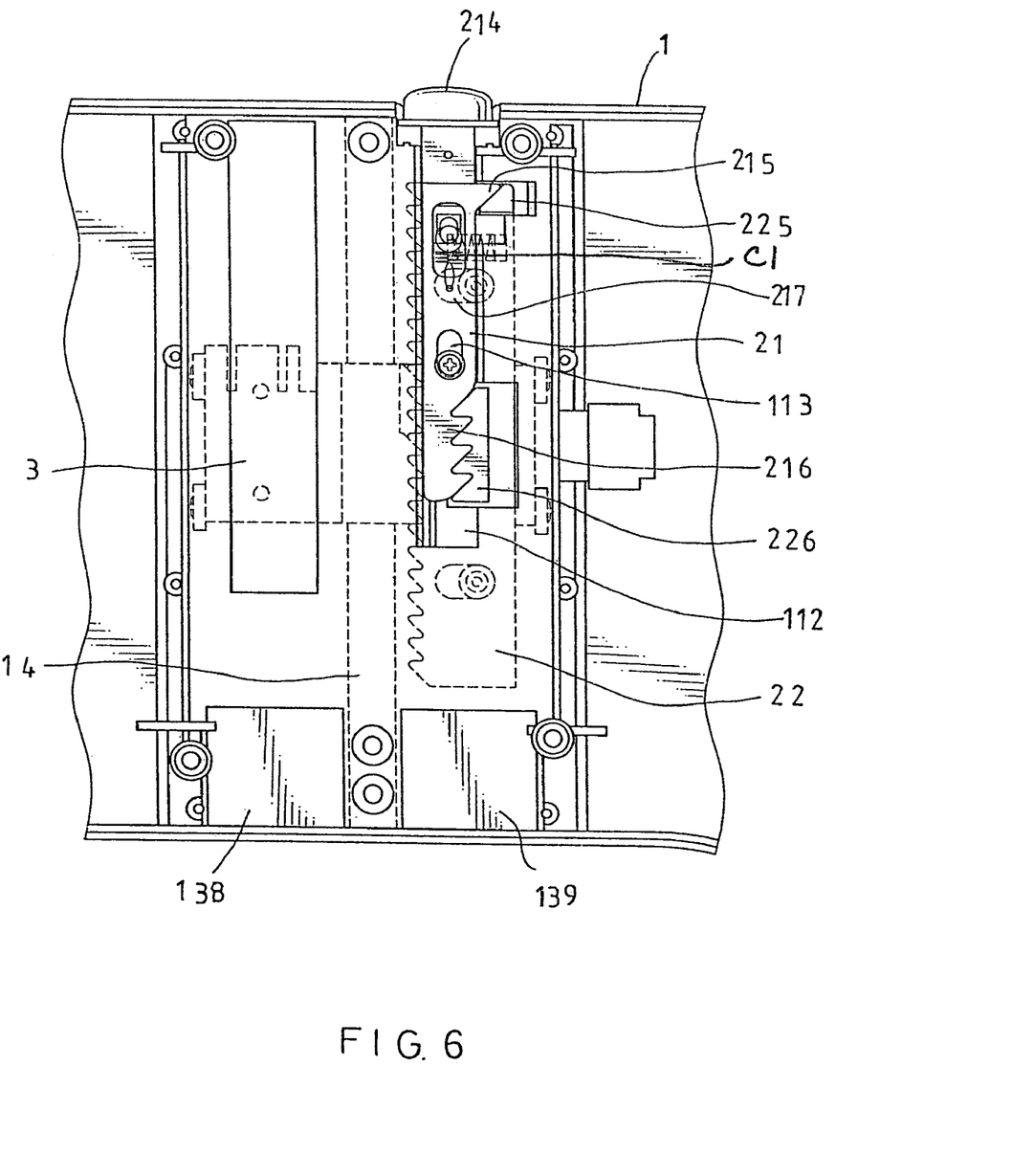
FIG. 6 is a sectional view of FIG. 1 showing the main body of the present invention.

Refer to FIGS. 2 and 3, the user takes the inserting members 416,417 of the fastening member 41 insert into the rooms 421,422 of the fastening slot 42, and the fastening slot 42 places an adequate place in accordance with the user or the machine 5 or button of the car B3. And, the fastening member 41 is fastened with the fastening slot 42 by the screw bolt 43 fastening with the hole 415 and the hole 423. Taking the plug B1 of the wire B2 connects to the machine 5 or the signal jack B4 of the button B1 of the car.

Refer to FIGS. 1, 4, 5, and 6, when the user wants to move the main body 1 down or up, the button 214 is pressed downwardly to make the stop member 21 move downwardly. When stop member 21 moves down, the spring C1 is extended, and the bevel beetle sheet 215 applies pressure on the block 225 which makes the positioning member 22 to slide to one side and compress the spring C in the rooms 221, 222. When the positioning member 22 slides to one side, gear trains 226,227 move to one side and gear train 226 releases from gear train 216 and gear train 227 releases from gear train 312 of the base 21, the gear train 216 of the stop member 21 and the gear train 312 of the base 21. Therefore, the user could move the main body 1 down or up according to the user needs, and releases the button 214 when the main body 1 is adjusted in the best position by the user. When the button 214 was released, the stop member 21 moves up by the spring C1 and the positioning member 22 goes back by the spring C in the rooms 221,222. Further, gear train 312 is pressed downwardly against the gear train 227 by the spring D.

Figure 7:
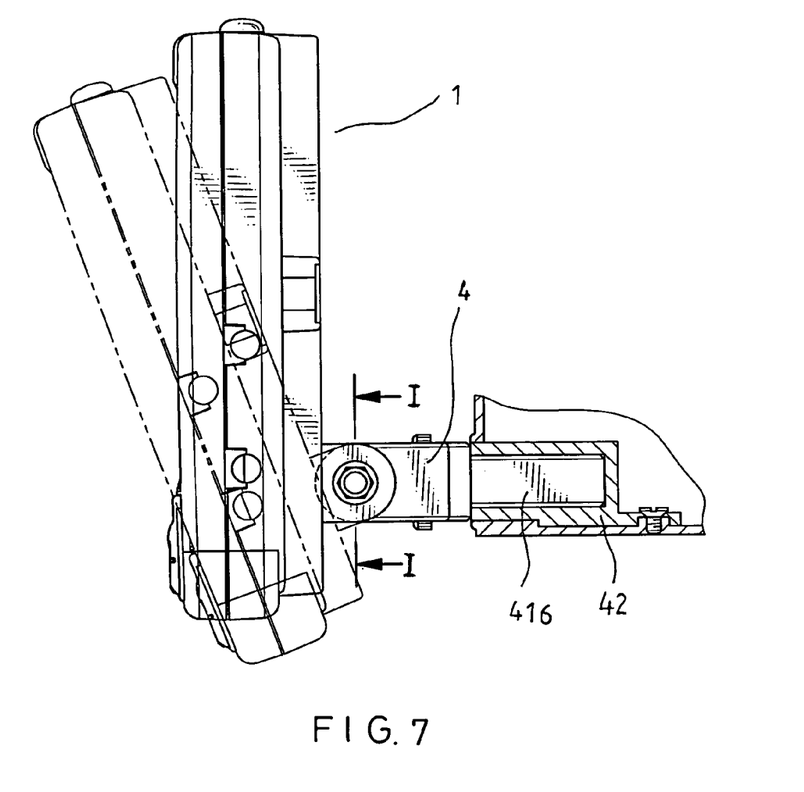
FIG. 7 is an schematic view showing the adjusting movement of the present invention.
Figure 8:
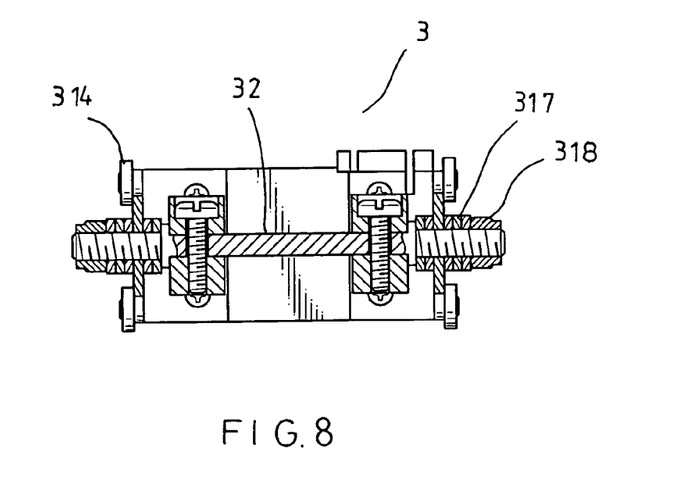
FIG. 8 is an illustrate view showing the FIG. 7 I—I sectional view of the present invention.

Refer to FIGS. 7 and 8, the user wants to adjust the slight angle which takes the main body 1 moving to the angle according to the user. Because the pivot 32, the nut 318, and the connecting means 3 is tightly fastened, and between of those comprise a plurality of pad 317 for providing the space when the main body 1 is adjusted.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. An adjustable support for a monitor comprising:
 a) a main body,
 b) a connecting device slidably connected to the main body at a back thereof;
 c) an assembly device connected to the connecting device; and
 d) a positioning device located on an interior of an alcove of the main body and having:
  i) a positioning member movable between engaged and disengaged positions; and
  ii) a stop member movable between released and depressed positions,
 wherein, when the stop member is in the released position, the positioning member is engaged with the connecting device and the connecting device is locked in a predetermined position, and, when the stop member is in the depressed position, the positioning member is disengaged from the connecting device and the connecting device is slidable upwardly and downwardly along the back of the main body, wherein the positioning member includes:
  a) two first rooms, each of the two first rooms has a spring;
  b) two second rooms limiting a movement between the engaged and disengaged positions;
  c) a block located on a front thereof;
  d) a first gear train located on the front thereof; and
  e) a second gear train located on an edge thereof.

2. The adjustable support according to claim 1, wherein the stop member includes:
 a) two limiting holes limiting a movement between the released and depressed positions;
 b) a bevel beetle sheet engaging the block of the positioning member;
 c) a third gear train located on a first end and engaging the first gear train; and
 d) a button locate on a second end thereof.

3. The adjustable support according to claim 1, wherein the main body has a concavity, the button is located in the convexity.

4. The adjustable support according to claim 1, wherein the connecting device includes a positioning gear train releasably engaged by the second gear train of the positioning member.

5. An adjustable support for a monitor comprising:
 a) a main body,
 b) a connecting device slidably connected to the main body at a back thereof;
 c) an assembly device connected to the connecting device; and
 d) a positioning device located on an interior of an alcove of the main body and having:
  i) a positioning member movable between engaged and disengaged positions; and
  ii) a stop member movable between released and depressed positions,
 wherein, when the stop member is in the released position, the positioning member is engaged with the connecting device and the connecting device is locked in a predetermined position, and, when the stop member is in the depressed position, the positioning member is disengaged from the connecting device and the connecting device is slidable upwardly and downwardly along the back of the main body, wherein the assembly device includes a fastening member connected to the connecting device and a fastening slot releasably connected to the fastening 20 member.

6. The adjustable support according to claim 5, wherein the fastening slot has two rooms, and the fastening member has two inserting members inserted the two rooms.

7. An adjustable support for a monitor comprising:
a) a main body,
b) a connecting device slidably connected to the main body at a back thereof;
c) an assembly device connected to the connecting device; and
d) a positioning device located on an interior of an alcove of the main body and having:
  i) a positioning member movable between engaged and disengaged positions; and
  ii) a stop member movable between released and depressed positions,
wherein, when the stop member is in the released position, the positioning member is engaged with the connecting device and the connecting device is locked in a predetermined position, and, when the stop member is in the depressed position, the positioning member is disengaged from the connecting device and the connecting device is slidable upwardly and downwardly along the back of the main body, further comprising a cover covering the alcove, the connecting device being inserted through strip holes in the cover.

8. An adjustable support for a monitor comprising:
a) a main body,
b) a connecting device slidably connected to the main body at a back thereof;
c) an assembly device connected to the connecting device; and
d) a positioning device located on an interior of an alcove of the main body and having:
  i) a positioning member movable between engaged and disengaged positions; and
  ii) a stop member movable between released and depressed positions,
wherein, when the stop member is in the released position, the positioning member is engaged with the connecting device and the connecting device is locked in a predetermined position, and, when the stop member is in the depressed position, the positioning member is disengaged from the connecting device and the connecting device is slidable upwardly and downwardly along the back of the main body, wherein the connecting device includes a connecting hole, and the main body includes a rod slidably inserted in the connecting hole.

9. An adjustable support for a monitor comprising:
a) a main body,
b) a connecting device slidably connected to the main body at a back thereof;
c) an assembly device connected to the connecting device; and
d) a positioning device located on an interior of an alcove of the main body and having:
  i) a positioning member movable between engaged and disengaged positions; and
  ii) a stop member movable between released and depressed positions,
wherein, when the stop member is in the released position, the positioning member is engaged with the connecting device and the connecting device is locked in a predetermined position, and, when the stop member is in the depressed position, the positioning member is disengaged from the connecting device and the connecting device is slidable upwardly and downwardly along the back of the main body, wherein the connection device includes a base and a pivot pivotally connected to the base.

10. The adjustable support according to claim 9, wherein the base includes a connecting hole, and the main body includes a rod slidably inserted in the connecting hole.

11. The adjustable support according to claim 9, wherein the main body includes a strip slot and a strip gear train located in the strip slot, and the base includes a damper engaging the strip gear.

* * * * *